No. 881,107. PATENTED MAR. 10, 1908.
W. CAREY.
BAND SAW.
APPLICATION FILED JULY 22, 1907.
2 SHEETS—SHEET 1.
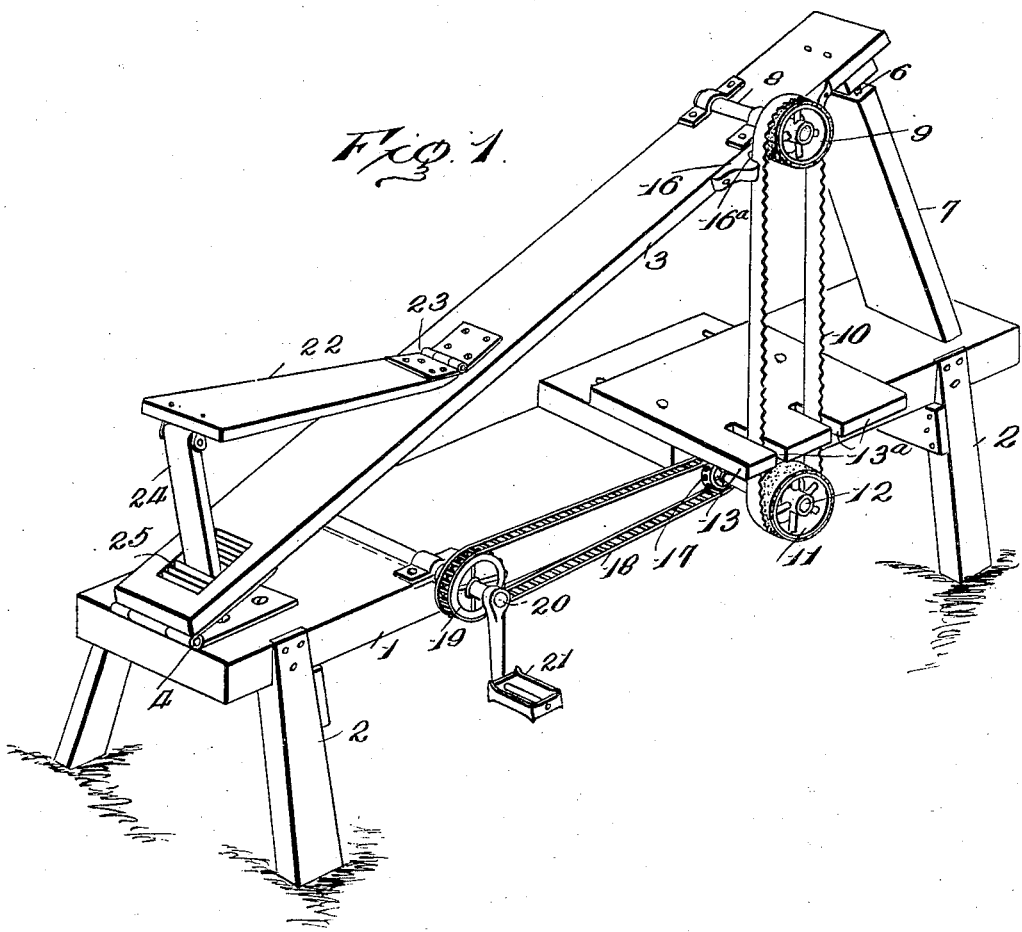
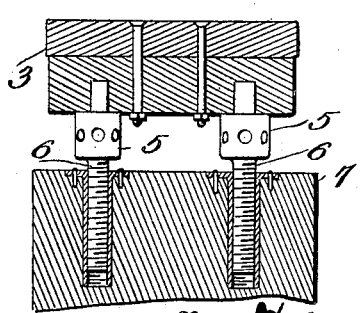
Witnesses
Inventor
Walter Carey
By
Attorneys No. 881,107. PATENTED MAR. 10, 1908.
W. CAREY.
BAND SAW.
APPLICATION FILED JULY 22, 1907.
2 SHEETS—SHEET 2.
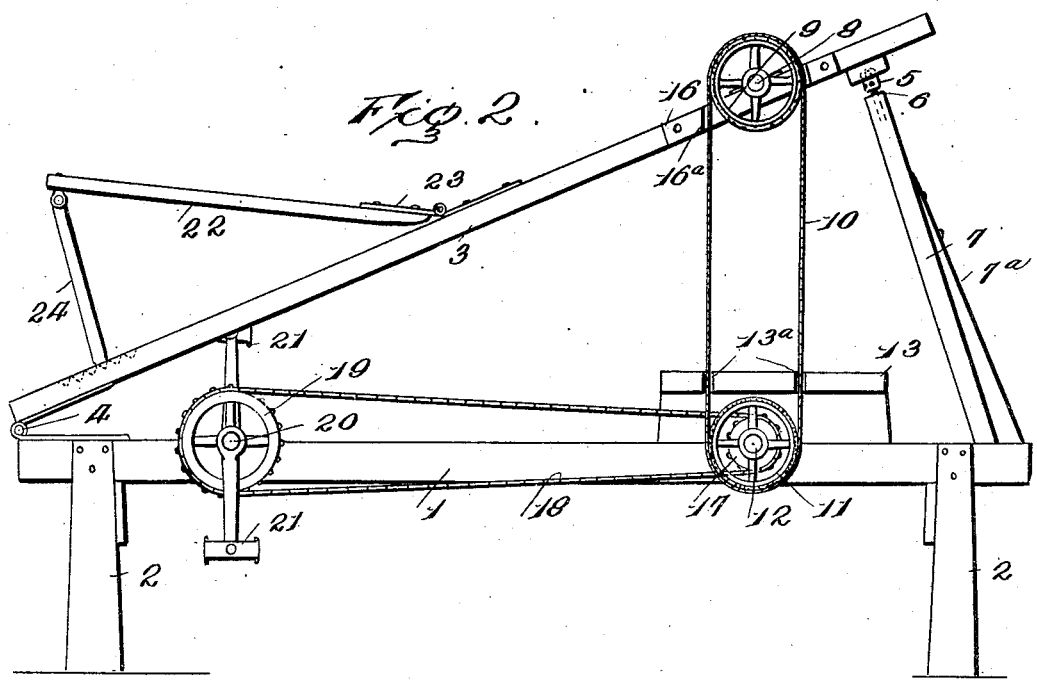
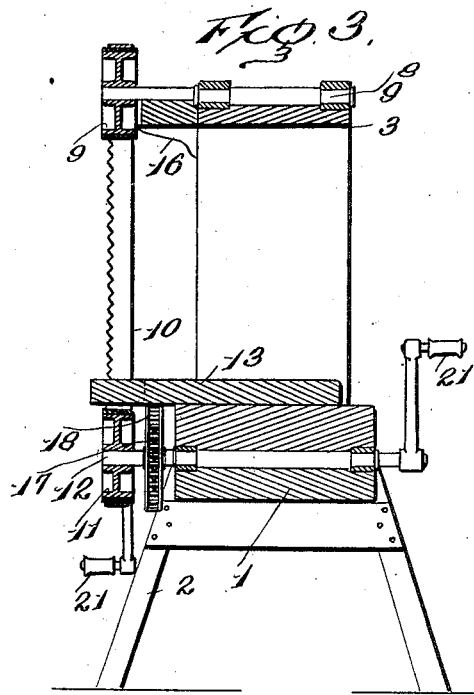
Inventor
Walter Carey
Witnesses
By
Attorneys

UNITED STATES PATENT OFFICE.

WALTER CAREY, OF LEXINGTON, MISSISSIPPI.

BAND-SAW.

No. 881,107.   Specification of Letters Patent.   Patented March 10, 1908.

Application filed July 22, 1907. Serial No. 384,925.

*To all whom it may concern:*

Be it known that I, WALTER CAREY, a citizen of the United States, residing at Lexington, in the county of Holmes and State of Mississippi, have invented certain new and useful Improvements in Band - Saws, of which the following is a specification.

This invention contemplates certain new and useful improvements in band sawing machines, and has for its object a light, simple, durable and efficient construction of machine of this character which will be capable of withstanding severe use and performing relatively heavy work, and the invention consists in certain constructions and arrangements of parts that I shall hereinafter fully describe and then point out the novel features in the appended claims.

For a full understanding of the invention and the merits thereof and also to acquire a knowledge of the details of construction and the means for effecting the result, reference is to be had to the following description and accompanying drawings, in which:

Figure 1 is a perspective view of my improved band saw machine. Fig. 2 is a side elevation thereof. Fig. 3 is a transverse sectional view, the section being taken approximately on the line of the shafts and pulleys which carry the saw. Fig. 4 is a detail sectional view illustrating the adjustable supports for the free end of the hinged beam.

Corresponding and like parts are referred to in the following description and indicated in all the views of the drawings by the same reference characters.

My improved band saw comprises a bench 1 supported on the legs 2 and a beam or bar 3 which is hinged at one end on the bench, as indicated at 4, and is held in an inclined position with its opposite end supported on the heads 5 of bolts 6 which work in the upper end of an upright or post 7 mounted at the opposite end of the bench and held rigidly by a brace $7^a$. A shaft 8 is journaled in bearings near the upper end of the beam 3, said shaft carrying the band wheel 9 which is preferably covered with rubber and which forms one of the traveling supports for the band saw 10. The other and lower support for the band saw is the wheel 11 mounted on the shaft 12 journaled in bearings or hangers secured to the bench 1.

13 designates the work supporting table which is secured on the bench 1 in any desired way and which is provided with slots $13^a$ for the saw 10 to pass therethrough. Above the work table 13 and preferably secured to one side of the beam 3 is a guide plate 16 similarly provided with slots $16^a$ to properly guide the saw.

On the shaft 12 is a sprocket wheel 17 connected by a chain 18 with a similar wheel 19 of the crank shaft 20, said shaft extending transversely of the table and journaled in any form of bearing. The crank shaft 20 is provided in its ends with pedals 21 by which it may be turned by the feet of the operator. The operator sits on the seat 22 which is supported by the beam 3 and which is hinged thereto at an end, as indicated at 23, the rear end of the seat being supported by the strut or bar 24, the lower end of which may be held in any one of the notches 25 in the beam, so as to hold the seat in more or less elevated position. By means of the hinged connection of the beam 3 to the bench and its mounting at its upper end on the heads 5 of the bolts 6, it is obvious that the beam may be raised whenever necessary to tighten the saw, by merely working the bolts upwardly in the upright or post 7.

In the practical operation of my improved band saw, the operator is seated on the seat 22 and turns the driving shaft 20 by applying his feet to the pedals 21. Through the chain 18 and sprockets 19 and 17, shaft 12 is turned and thereby effects the travel of the saw around the wheels 11 and 9, the work being operated upon being held on the table 13.

It is obvious that the entire framework of the machine may be formed of iron, thereby producing a strong structure, without making the machine unnecessarily heavy, as the bench, its post 7, the beam 3 and its seat 22, may all be composed of open work.

Having thus described the invention, what is claimed as new is:

1. A machine of the character described, comprising a bench, a beam hinged at one end to said bench, an upright supported on the bench and on which the other end of said beam rests, means for raising and lowering the beam, a band saw supported by the beam and by the bench, whereby the vertical adjustment of the beam may effect the tightening of the saw, a drive shaft journaled in the bench, a driving connection between the said shaft and the saw, and means for turning said shaft.

2. A machine of the character described, comprising a bench provided at one end with an upright, a beam hinged at one end to the bench, adjustable bolts working in the upper end of said upright and on which the other end of said beam rests, the beam being held in an inclined position, a shaft journaled on the beam, a wheel carried by said shaft, a shaft journaled underneath the first named shaft, a wheel carried by said last named shaft, a band saw extending around said wheels, a crank shaft journaled in the bench and having a driving connection with the saw, said crank shaft being provided with pedals, and a seat mounted on the beam.

3. A machine of the character described, comprising a bench provided at one end with a post, adjusting bolts mounted in the upper end of said post, a beam hinged at one end to the bench with its other end resting on said post, a band saw carried by the bench and the beam with its stretches extending vertically, a work table mounted on the bench and provided with slots through which the stretches pass, a guide plate secured to the side of the beam and also provided with grooves for the passage of the saw, and means for driving the saw.

4. A machine of the character described, comprising a bench provided at one end with an upright, a beam hinged at one end to the bench and supported at its other end on the upright, means for raising the last named end of the beam, a band saw carried by the beam and bench, whereby the raising of the beam will effect the tightening of the saw, a driving shaft journaled in the bench and having a driving connection with the saw, said shaft being provided with foot pedals, and a seat hinged at one end to the beam and provided at its other end with a depending strut, the beam being provided with notches to receive the lower end of the strut, whereby to vertically adjust the seat on the beam.

In testimony whereof I affix my signature in presence of two witnesses.

WALTER CAREY. [L. S.]

Witnesses:
 ARCHIBALD MCDOWELL PEPPER,
 LELIA STANSBURY.